United States Patent [19]

Cooke et al.

[11] 3,917,891
[45] Nov. 4, 1975

[54] FRAGMENTATION SHIELD FOR IMPACT RESISTING OPTICAL MEDIUM

[75] Inventors: William C. Cooke; Albert H. Agett, both of Kingsport, Tenn.

[73] Assignee: ASG Industries Inc., Kingsport, Tenn.

[22] Filed: Apr. 11, 1974

[21] Appl. No.: 460,013

[52] U.S. Cl. .................... 428/337; 89/36; 156/107; 156/109; 428/339; 428/438; 428/441; 428/911
[51] Int. Cl.² .................... B32B 3/06; B32B 17/08; C03C 27/10; F41H 5/04
[58] Field of Search .................... 161/43–45, 161/199, 165, 200, 404, 201, 203; 89/36 A, 36 L; 156/99, 107, 109

[56] References Cited
UNITED STATES PATENTS

| 2,145,930 | 2/1939 | Herron | 156/107 |
| 2,991,209 | 7/1961 | Worrall | 156/99 X |
| 3,630,814 | 12/1971 | Arnold | 89/36 A X |
| 3,657,057 | 4/1972 | Schorr et al. | 156/99 X |
| 3,671,370 | 6/1972 | Littell, Jr. | 156/99 X |
| 3,762,981 | 10/1973 | Blank | 156/99 X |
| 3,864,204 | 2/1975 | Shorr et al. | 161/199 X |

Primary Examiner—Philip Dier
Attorney, Agent, or Firm—Pennie & Edmonds

[57] ABSTRACT

A fragmentation shield having capability of preventing fragmented particles of the shield material from becoming airborne due to high velocity impact is disclosed. The shield is in the form of a laminate including a plurality of layers of optical material and interposed bonding material layers or monolithic plastic. The bonding material or plastic displays an index of refraction closely matching that of the optical material. The shield is supported by a frame. A fragment shield likewise is supported by the frame. The fragment shield is disposed in parallel spaced relation to the laminate or plastic thereby to provide a closed air space therebetween.

17 Claims, 3 Drawing Figures

FRAGMENTATION SHIELD FOR IMPACT RESISTING OPTICAL MEDIUM

The present invention relates to an optical product having capability of preventing possible fragmentations from the optical medium from becoming airborne away from the product. More particularly, the invention relates to a bullet resisting product including a laminate of a plurality of bullet resisting glass panels bonded together by a bonding agent with an index of refraction closely matching that of the glass, a fragment shield and a frame for supporting both the laminate and the shield in parallel, spaced disposition.

BACKGROUND OF THE INVENTION

The manufacture of laminated bullet resisting glass is well known and widely practiced. Such bullet resisting glass is conventionally fabricated from a number of layers of plate or float glass (i.e., a term applied to the product of a manufacturing process during which the glass product is formed upon a molten bath of tin) and interposed layers of bonding material having an index of refraction closely matching that of the glass being used. A commonly used bonding agent is polyvinyl butyral plastic film. The several layers are bonded together under conditions of heat and pressure to form the laminate.

Bullet resisting glass generally is fabricated in thicknesses which may vary from about 1 3/16 inches to about 2 inches. Thicker composites are common for military applications.

Both plate and float glass are brittle and by themselves have poor impact resistance. When layers of glass are laminated with polyvinyl butyral plastic, it has been found that the elastic strength of the plastic is incorporated into the composite mass. This greatly increases the impact resistance of each layer of glass by spreading the shock waves and by holding together the broken glass fragments in the immediate vicinity of the point of impact. The elastic strength, rigidity, and adhesion of the plastic to the glass play important roles in the overall bullet resistance of the composite make up. Normally the plastic bonding layer will be in the range of approximately 15 mils in thickness and the plasticizer content of the plastic may vary from 46 parts down to about 21 parts depending on the application and end use of the product. It is common practice to bond the glass layers with polyvinyl butyral of a thickness of 15 mils. In commercial applications the polyvinyl butyral normally contains 46 parts plasticizer whereas military specifications usually call for polyvinyl butyral containing 21 parts plasticizer for all applications.

Presently available products utilizing alternately a 15 mil thickness bonding layer between, for example, four ¼ inch glass plates and a single ⅛ inch glass combining in an overall 1 3/16 inch thick medium power bullet resisting glass have been found to use a low content (in parts) of plasticizer in the bonding material. To this end polyvinyl butyral containing 21 parts plasticizer may be used so that the product passes an impact and spall penetration test. However, polyvinyl butyral containing 21 parts plasticizer is very stiff and difficult to sandwich between the glass layers. Further, this bonding material has a powdered interleaving which requires removal by washing before use. The resultant laminated product contains excessive defects which detract from its overall appearance and render it economically impracticable.

BRIEF DESCRIPTION OF THE INVENTION

The present invention seeks to provide in a similar product of 1 3/16 inch thickness utilizing a polyvinyl butyral plastic bonding agent including a plasticizer content (in parts) on the high side to pass an impact and spall penetration test.

In an important aspect, the present invention is directed to a bullet resisting glass product including a plurality of layers of optical material bonded together into a laminate which is supported by a frame member. The frame member also supports a fragment shield in spaced, parallel relationship relative to the laminate.

The laminate may include layers of either optical plastic, such as polycarbonate or acetate butyrate, or glass, either plate, float or sheet (hereinafter collectively referred to as "glass") and a binder. It is preferred to use glass panels and a binder of polyvinyl butyral having a thickness of about 15 mils and including about 40 parts plasticizer or more. The fragment shield may be either laminated glass or plastic.

In a second aspect, the present invention proposes a frame member including an internal spacing element supporting the peripheral region of both the laminate and the shield.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

DESCRIPTION OF THE DRAWING

The accompanying drawing forms a part of the present application. By this drawing.

DESCRIPTION OF THE PREFERRED EMBODIMENT

Figure 1:
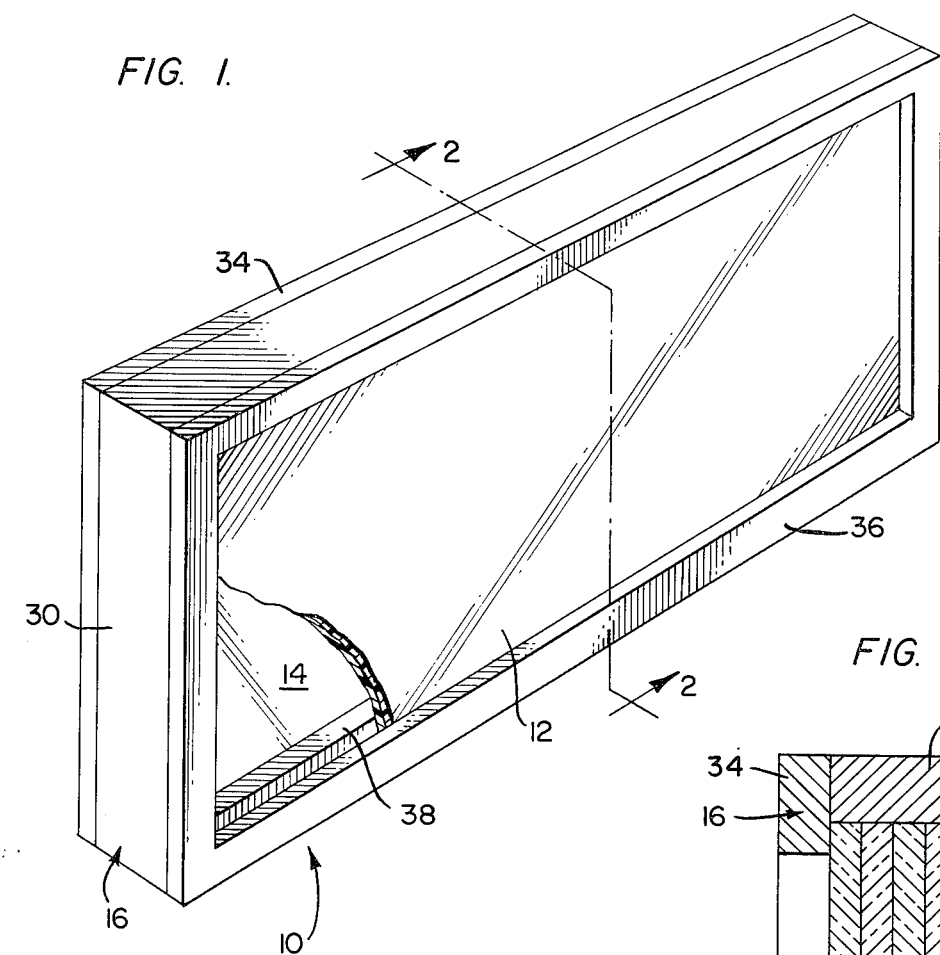
FIG. 1 is a perspective view of the bullet resisting glass product having a portion of the fragment shield broken away to illustrate the air space.

The drawing figures illustrate a bullet resisting barrier 10 including a plurality of layers of optically transparent material 14, 18, 20, 22, 24, interposed plastic bonding layers 19, 21, 23, 25 to permit bonding of the transparent material, a fragment shield 12, a further layer 14 of optically transparent material, and a frame construction 16 for supporting the fragment shield in spaced parallel relation to the layer 14.

Any number of layers of optically transparent material may be utilized according to the bullet resisting capability desired. For example, in addition to the layer 14, a plurality of four layers 18, 20, 22 and 24 has been used successfully under test conditions and is preferred.

The optical sheets preferably are formed of glass. The sheets may be approximately 0.25 inches in thickness.

The alternate plastic bonding layers 19, 21, 23, 25 may be on the order of about 15 mils to about 30 mils in thickness and formed from a material having an index of refraction closely matching the index of refraction of glass. Polyvinyl butyral plastic is preferred. For ease of drafting and for clarity the interposed plastic bonding layers, being exceedingly thin, are not shown in FIG. 2 but only in FIG. 3.

The layer 14 may be formed of glass and similarly bonded to layer 24 by an interposed layer of plastic 25. The layer 14 is of a thickness less than the thickness of any one of the layers 18, 20, 22 and 24. The layer 14 may be approximately 0.125 inches in thickness. The layer 14 serves the purpose of reducing the thickness and size of those fragments which may spall from the inner surface of the glass after impact of a bullet.

The layers may be laminated under heat and pressure in accordance with conventional practice in the manufacture of safety glass. The laminate which is formed will be approximately 1 3/16 inches in thickness which is within the limits of presently commercially recognized bullet resisting glass. By increasing the number of glass lamina sheets a thicker barrier of 2 inches or more may be fabricated. As suggested, the latter construction is common in military application.

The improvement of the present glass product resides in the use of a fragment shield 12 which is spaced from the above bullet resisting glass laminate by means of the frame 16. As will be seen below, the fragment shield together with the means to space the same from the bullet resisting glass laminate increases the effectiveness of the assemblage without the heretofore required increase in the thickness of the glass laminate or in the reduction in plasticizer content.

Figure 2:
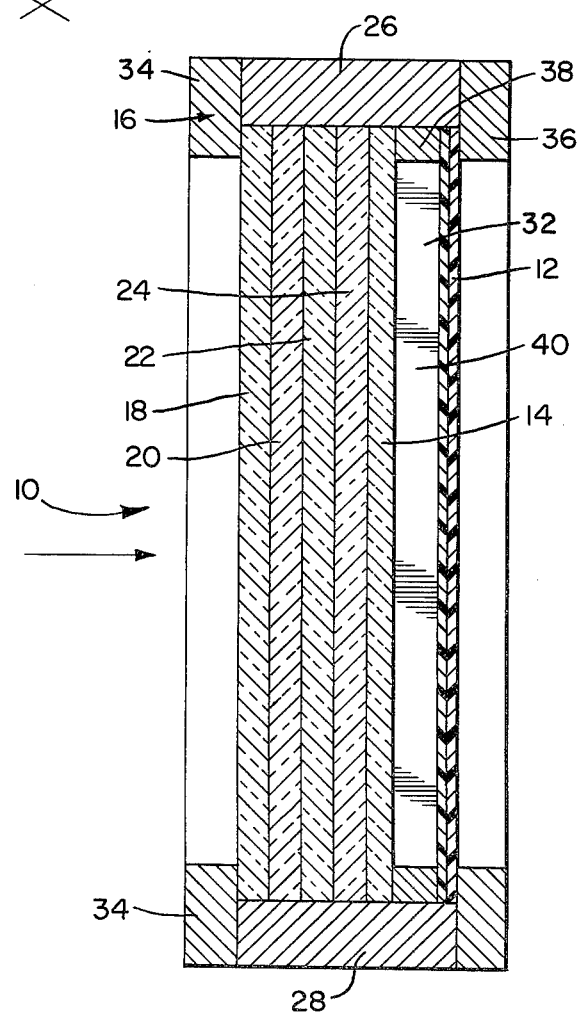
FIG. 2 is a vertical section as seen along the lines 2—2 in FIG. 1.
Figure 3:
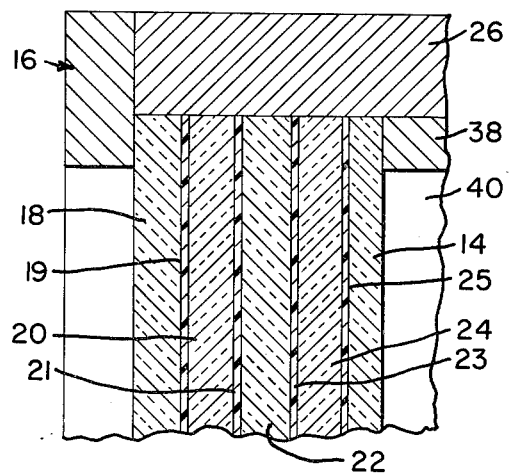
FIG. 3 is an enlargement of the upper portion of FIG. 2.

The fragment shield 12 itself may be formed of various optically transparent materials. Laminated glass may be utilized. Laminated lami-lami, i.e., a lamination including two sheets (window glass) of 0.108 inch thickness and an interlayer of 0.015 inch thick polyvinyl butyral film, is the most economical thickness. For larger windows a ⅛ inch glass plate laminated to a second ⅛ inch glass sheet may be required. The shield may also be formed from "Uvex," plexiglass or sheets of acrylic plastic, or "Lexan." "Uvex" is a tradename of Eastman Kodak for their optically clear cellulose acetate butyrate sheet. "Lexan" is a tradename of General Electric for their optically clear polycarbonate. Additionally, the shield may be formed of either polished wired glass or float glass having a thickness of about one-fourth inch. While all of the above may be used as shown in FIG. 2, shield 12 comprises two laminae cross-hatched to indicate one of the plastic materials mentioned above although, as previously mentioned, the laminated lami-lami of the previously mentioned window glass is preferred where economy is an important consideration.

The frame 16 serves to mount the laminate formed by the layers 14, 18, 20, 22 and 24 and the fragment shield 12. As illustrated in the figures, the frame includes a top 26, bottom 28, and side members 30 (32) which may be connected in any suitable manner. A front 34 and back border member 36 provide lateral securement of the components.

A spacer 38 is disposed within the confines of the frame defined by the back member and juxtaposed to the members 26, 28, 30, 32. The spacer may be formed by a tape, such as a foam tape manufactured by the Minnesota Mining and Manufacturing Company under the trademark "Scotch-Mount," a double coated tape No. 4004, which has adhesive on both surfaces, or by an extruded or otherwise formed metal member whose edges are sealed to the frame by a butyl rubber as in the case of insulated glass units, or by a wooden framing member. The wooden framing member is sealed in like fashion whereas the foam tape may provide opposed adhesive surfaces for adherence to the layers 12 and 14.

The spacer member may be of such dimensions to provide an air gap 40 of from approximately 0.25 to about 0.875 inches in width. By means of the air gap and fragment shield fragments which spall from the glass laminate upon impact of a bullet travelling in the direction of the arrow in FIG. 2 will be trapped.

Commercial grades of bullet resisting glass are listed below:

| Rating | Glass Thickness | Weapon | Muzzle Energy |
| --- | --- | --- | --- |
| Medium Power | 1-3/16" | .38 Super Automatic | 475 ft. lbs. |
| High Power | 1½" | .375 Magnum Revolver | 740 ft. lbs. |
| Super Power | 1¾" | .44 Magnum Revolver | 1150 ft. lbs. |
| Rifle High Power | 2.0" | 30–60 Military Rifle | 2830 ft. lbs. |

The greater the thickness the greater the resistance characteristic of the bullet resistance glass, laminated in a fashion as described.

The object of a window of bullet resisting glass is to protect personnel standing directly behind or in the immediate vicinity of the window from both bullets and fragments of glass which break loose from the inner surface of the glass. Those fragments include glass particles ranging in size from powder to pieces measuring ½ × 1 inches in size. The bulk of the fragments are ⅛ × ⅛ × 1/16 inches. It is common for discs of plastic ranging in size from 1½ up to 3 inches in diameter to tear loose from bulges which form on the inner surface of the glass. These discs of plastic are coated on both surfaces with glass fragments. And as indicated, if the inner surface of the bullet resisting glass or layer 14 should be one-eighth inches thick the size of the glass fragments will be minimized slightly.

It is assumed that a window of bullet resisting glass will effectively stop or contain the bullets fired at it from a weapon equal to the rating of the window. From the point of impact a shock wave precedes the bullet into the glass. The bullet is contained by the glass, yet the shock wave travels through the thickness of the glass while spreading over a circular area having a diameter of 6 inches or more. This area contains broken pieces of glass which radiate from the point of impact in increasing particle size. The plastic layers usually hold the glass intact. When a second or third shot falls within the 6 inch diameter area of shattered glass, the bullets and shock waves do appreciably more damage to the window than was done by the first shot. Bulges on the inner surface formed of stretched plastic and fragmented glass are usually associated with the second and third shots. During the movement of plastic and glass as the bulges are formed, a shower of glass particles break loose from the outer surface of the bulged glass. The force with which the particles leave the glass varies on their nearness to the center of the shock wave and to the intensity of the shock wave as it passes through the glass. During the second and third shots the intensity through the weakened glass may be great enough to tear small discs of plastic and glass from the interior of the bulges.

An indicator placed 18 inches behind the bullet resisting glass is normally used to record the damage from flying glass particles. In the tests whose experimental data follows a 3/16 inch corrugated cardboard (200 lb. test) was used as the indicator material. Any penetration of the front cardboard surface in excess of one or two nicks one-eighth inch in length after three shots was considered sufficient penetration to fail the piece of glass being tested.

The objective of the present invention is twofold — to produce economically a bullet resisting glass of minimum thickness which will stop or contain bullets spaced 4 inches apart in a triangular pattern in the approximate center of a 12 × 12 inch test sample of glass and at the same time pass the cardboard penetration test against flying glass particles when a cardboard indicator is mounted 18 inches behind the test sample. The test results are accumulated from firing done at the close range of 15 feet or less. The ammunition used was rated as follows:

| | |
|---|---|
| Bullet | 130 grain metal cased |
| Muzzle Energy | 475 ft. lbs. |
| Muzzle Velocity | 1280 feet/second |

Early testing was carried out using Remington 38 Super Automatic ammunition while later testing was carried out exclusively with Western Super X 38 Super Automatic ammunition. The latter ammunition is considered to consistently develop higher muzzle velocities. It is also considered that the latter ammunition is more destructive than the Remington ammunition. This consideration is based upon accumulated test data.

Samples were test fired while at room temperature of 70°F., or after having been either frozen on one side for 3 hours at −25°F. of after being heated in an oven at 120°F. for three hours. Early in the testing it became evident that a structure passing the high temperature test (120°F. for 3 hours) would pass the other two tests, also. Therefore, testing was carried out with test specimens which first had been heated in an oven at 120°F. for 3 hours.

Test data has indicated that the plastic bonding material, i.e., the 15 mil polyvinyl butyral used in the standard 1 3/16 inch medium power bullet resisting glass, preferably should contain on the order of about 40 parts plasticizer in order to produce a bullet resisting glass capable of stopping or containing three Western Super X 38 caliber bullets. The standard 1 3/16 inch product laminated with polyvinyl butyral containing more than 40 parts plasticizer, for example 43 parts plasticizer, or 46 parts plasticizer, will not stop or contain three Western Super X 38 bullets. Usually the second or third bullet completely penetrated the specimen.

Our test effort concentrated on producing a medium power bullet resisting glass that would stop the three Western Super X 38 bullets while passing the spall penetration test. Variations in thicknesses of up to 1 9/16 inches were tested. Polyvinyl butyral with plasticizer contents of 31, 37.5, 40 and 43 parts were tested as well as the standard 46 parts plasticizer. As stated, polyvinyl butyral plastic bonding material with 40 parts or less plasticizer was required to stop the three Western Super X 38 bullets. However, standard 1 3/16 inch glass laminated with this plastic did not pass the spall penetration test at the elevated temperature.

Remarkably, however, it was found that the incorporation of a void or air space between the inner face of the bullet resisting glass and the inclusion of a fragment shield of laminated safety glass or plastic was sufficient to stop the flying glass fragments and render the product safe.

A piece of standard 1 3/16 inch bullet resisting glass was fabricated with a ⅛ inch air space and a piece of lami-lami glass. The lami-lami glass was secured to the inner face of the bullet resisting glass with 3M foam tape having adhesive on both surfaces. After heating the glass to 120°F. for 3 hours it was test fired with three Western Super X 38 bullets. It passed the penetration test even though the lami-lami shield was cracked by the bulges.

The same test was conducted using a ¼ inch void between the bullet resisting glass and the transparent shield. In this case ¼ inch foam tape was used to secure the lami-lami glass to the inner face of the bullet resisting glass. This fabrication also passed the spall penetration test after heating to 120°F. for 3 hours. The laminated lami glass shield again was cracked by the bulges but remained intact.

Glass fragments which normally spall from the inner face of the bullet resisting glass are trapped in the air space. This may fill to a depth of 2 inches or more depending on the width of the air space. Physical contact is made between the bullet resisting glass and the laminated glass shield by the bulges following the second and third shots. It is believed that the shock wave after passing through the bullet resisting glass is absorbed by the air space. This is evident since the first shot into bullet resisting glass followed by a ⅛ inch air space does not crack the lami shield. The bulges which make contact with the lami shield do not have sufficient force to rupture the polyvinyl butyral layer between the two pieces of lami glass.

Identical experiments were run using a piece of cellulose acetate butyrate plastic having a thickness of 0.060 inches in place of the laminated lami glass shield. The flexibility of the plastic sheet caused it to easily conform to the shape of the bulges in the bullet resisting glass.

Air spaces were later formed using ¼ inch thick strips of wood to separate the fragment shield from the bullet resisting glass. The wood strips were used with equal facility. Since the bulges in the bullet resisting glass sometimes reached a height of three-fourths inches, an air space of seven-eighths inches was formed using wood spacers. This spacing is ideal if framing space is available.

EXPERIMENTAL DATA

The following data is taken from a series of bullet resisting tests. The standard make up of medium power bullet resisting glass consists of four sheets of ¼ inch glass and one sheet of ⅛ inch glass laminated with 15 mil polyvinyl butyral containing from 43 to 46 parts plasticizer. The actual thickness of the piece after autoclaving is 1 3/32 inches. The aummunition used for the tests was Western Super X 38 Automatic bullets.

| Type of Sample | No. Shots | Spacing | Weight of Fragments | Penetration |
|---|---|---|---|---|
| Std. 1-3/16 inches make up using PVB containing 43 parts plasticizer. Thickness - 1-3/32 inches - heated at 120°F. for 3 hours. | 3 | Good | 24.9 grams | Failed 1st shot. Approx. 10 nicks in cardboard. No bulges - FAILED TEST. |
| 6 pcs. ¼ inch, 1 pc. ⅛ inch laminated with 15 mil PVB containing 46 parts plasticizer. Thickness - 1-9/16 inches - heated at 120°F. for 3 hours. | 3 | Good | 13.2 grams | Passed 1st shot. Failed 2nd and 3rd shots. 2 nicks ⅛ inch and ¼ inch plus needles imbedded in cardboard. FAILED TEST. |

The immediately above test illustrates the effect of increasing thickness.

| Type of Sample | No. Shots | Spacing | Weight of Fragments | Penetration |
|---|---|---|---|---|
| 3pc. ¼ inch, 3pc. ⅛ inch laminated with 15 mil PVB containing 46 parts plasticizer. Thickness 1-5/32 inches - heated at 120°F. for 3 hours. | 3 | Good | 44.0 grams | Failed 1st shot Heavy penetration of cardboard by glass fragments on 2nd and 3rd shots. FAILED TEST. |

The immediately above test illustrates the effect of additional pieces of ⅛ inch glass.

| Type of Sample | No. of Shots | Spacing | Weight of Fragments | Penetration |
|---|---|---|---|---|
| 4 pcs. ¼ inch glass, 1 pc. ⅛ inch glass, 1 pc. micro glass laminated with 15 mil PVB containing 40 parts plasticizer. Thickness - 1-5/32 inches - heated at 120°F. for 3 hours | 3 | Good | 35.7 grams | Passed 1st shot. Failed 2nd and 3rd shots - cardboard contained 3 cuts ¼ inch and several smaller nicks- FAILED TEST. |
| 5 pcs. ¼ inch glass, 1 pc. ⅛ inch glass laminated with 15 mil PVB containing 40 parts plasticizer -Thickness - 1-5/16 inches heated at 120°F. for 3 hours | 3 | Good | 36.7 grams | Passed 1st shot. 2nd and 3rd shots were marginal - six nicks were found in cardboard ⅛ inch long. FAILED TEST. |
| Std. make up laminated with 15 mil PVB containing 46 parts plasticizer. A ⅛ inch air space was formed by 3M tape around edges of glass. A fragment shield of laminated lami glass completed the make up. Overall thickness - 1¼ inches - heated at 120°F. for 3 hours | 3 | Good | 6.10 grams | All 3 shots passed. 1st did not break cover shield. 2nd and 3rd shots caused bulges which did break the cover glass. Shield did not rupture. PASSED TEST. |
| Std. make up laminated with 15 mil PVB containing 46 parts plasticizer. ¼ inch air space was provided by 3M foam tape. Laminated lami glass was used for fragmentation shield. Total thickness - 1⅜ inches - heated at 120°F. for 3 hours. | 3 | Good | 5.51 grams | All 3 shots passed. 1st did not break cover glass. 2nd and 3rd shots caused bulges which did break cover glass. Penetration of cardboard by glass dust only. PASSED TEST. |

-continued

| Type of Sample | No. of Shots | Spacing | Weight of Fragments | Penetration |
|---|---|---|---|---|
| Std. make up laminated with 15 mil PVB containing 46 parts plasticizer. Mounted in frame with ¼ inch air space formed by ¼ inch wood spacer and fragmentation shield of laminated lami glass. Thickness of bullet resisting glass 1-3/32 + ¼ inches air space + 3/16 inches lami-lami glass - heated at 120°F. for 3 hours. | 3 | Good | 55.5 grams | 1st and 2nd shots passed. 3rd shot penetrated bullet resisting glass and fragmentation shield. Several small nicks in cardboard - FAILED TEST. |
| Std. make up laminated with 15 mil PVB containing 46 parts plasticizer. Test piece was mounted in frame with ¼ inch air space formed by ¼ inch wood spacer with .060 inch "Uvex" plastic as the fragmentation shield. Thickness - 1-3/32 inches + ¼ inch air space + .060 inch "Uvex" - heated at 120°F. for 3 hours. | 3 | Good | None | All 3 shots passed. 2nd and 3rd shots caused heavy bulges in glass. Inner face of plastic was abraded by fragments - No rupture occurred. PASSED TEST. |
| Std. Make up laminated with 20 mil PVB containing 31 parts plasticizer - Thickness - 1-3/32 inches heated at 120°F. for 3 hours. | 3 | Good | 11.00 grams | No penetration on 1st and 2nd shots. Several needles and fine fragments on 3rd shot. Marginal. FAILED TEST. |

Note: No fragment shield used with the immediately above test.

| | | | | |
|---|---|---|---|---|
| Std. make up laminated with 25 mil PVB containing 37.5 parts plasticizer. Thickness - 1⅛ inches. Heated at 120°F. for 3 hours. | 3 | Good | 11.8 grams | Passed 1st shot. 2nd shot marginal. 3rd shot failed. Several large particles embedded in cardboard. FAILED TEST. |

Note: No fragment shield used with immediately above test.

| | | | | |
|---|---|---|---|---|
| Std. make up laminated with 15 mil PVB containing 46 parts plasticizer. A ⅞ inch air space was formed using wood spacers with a laminated lami glass shield. Heated at 120°F. for 3 hours. | 3 | Good | 31.2 grams | 1st and 2nd shots passed. 3rd shot ventilated bullet resisting glass and shield. Three small nicks in cardboard. PASSED TEST. |
| Std. make up laminated with 15 mil PVB containing 46 parts plasticizer. Air space ⅞ inches with fragment shield of .060 inches "Uvex" plastic. | 3 | Good | 20.0 grams | 1st and 2nd shots passed. 3rd shot ventilated glass and forced one side of "Uvex" out of frame. No penetration of cardboard noted. PASSED TEST. |
| Std. make up laminated with 20 mil PVB containing 31 parts plasticizer. Glazed with ⅞ inch air space and laminated lami glass fragment shield. Thickness of glass 1-3/32 inches - heated at 120°F. for 3 hours. | 3 | Good | None | Bulges from 2nd and 3rd shots touched lami shield. The inside piece cracked on 3rd shot The outside piece did not break. All glass fragments were contained in the void. PASSED TEST. |
| Std. make up laminated with 25 mil PVB containing 37.5 parts plasticizer. Glazed with ⅞ inch air space and .060 inch "Uvex" fragment shield. | 3 | Good | None | Bulges from 2nd and 3rd shots touched "Uvex" shield. All glass fragments contained in void. PASSED TEST. |

From the foregoing, it will be readily seen that a standard make up bullet resistance barrier with the further incorporation of an air barrier and a fragment shield will serve to provide an effective product which heretofore could only be recognized by increasing the thickness of the glass laminate or reducing significantly the plasticizer content of the bonding material. The medium power product produced is more commercially attractive because of the economy in the reduced thickness of the laminate glass and in the aesthetic characteristics obviated by the use of increased plasticizer.

Having described the invention, what is claimed is:

1. A barrier for use as a shield to prevent fragmentation of any one of the barrier medium and bullet resisting glass from becoming airborne upon impact along the path of movement of a projectile comprising a frame member, a lamination including a plurality of optical layers and interposed plastic material bonding layers, said plastic material bonding layers being significantly thinner in cross-section than any one of said optical layers and having an index of refraction substantially matching that of said optical layers, at least the optical layer furthermost from said impact point being of a thickness less than the thickness of the remaining optical layers of said lamination, a fragment shield element, said lamination and element supported by said frame in parallel relation, and means for maintaining a space between said furthermost layer of said lamination and element.

2. The barrier of claim 1 wherein said barrier medium and bullet resisting glass are at least approximately 1 3/16 inches in thickness.

3. The barrier of claim 2 wherein said remaining optical layers each are one-fourth inch in thickness.

4. The barrier of claim 2 wherein said furthermost optical layer is one-eighth inch in thickness.

5. The barrier of claim 1 wherein each said plastic material bonding layer is of a thickness of from about 15 mils to about 30 mils.

6. The barrier of claim 5 wherein each said plastic material bonding layer is approximately 15 mils in thickness.

7. The barrier of claim 5 wherein each said plastic material bonding layer is formed of polyvinyl butyral having a plasticizer content of less than about 46 parts.

8. The barrier of claim 7 wherein said polyvinyl butyral has a plasticizer content of about 40 parts.

9. The barrier of claim 1 wherein each said optical layer is formed of glass.

10. The barrier of claim 1 wherein said furthermost optical layer is spaced from said element by a distance of at least one-eighth inch.

11. The barrier of claim 1 wherein said furthermost optical layer is spaced from said element by a distance of about at least seven-eighths inches.

12. The barrier of claim 1 wherein said element is a laminated body including at least two optical layers and interposed plastic bonding material layers, each of said interposed layers having a substantially matched index of refraction.

13. The barrier of claim 1 wherein said element is formed of cellulose acetate butyrate sheet having a thickness of about 0.060 inches.

14. The barrier of claim 11 wherein said element is formed by ¼ inch tempered glass sheet.

15. The barrier of claim 11 wherein said element is formed by ¼ inch float glass.

16. The barrier of claim 11 wherein said element is formed by ¼ inch polished wire glass.

17. The barrier of claim 1 wherein said element is used with bullet resistant glass having a rating of at least medium power.

* * * * *

UNITED STATES PATENT AND TRADEMARK OFFICE
CERTIFICATE OF CORRECTION

PATENT NO. : 3,917,891
DATED : November 4, 1975
INVENTOR(S) : William C. Cooke and Albert H. Agett It is certified that error appears in the above-identified patent and that said Letters Patent are hereby corrected as shown below:

Column 5, line 11, "varies on their" should be

--varies depending on their--.

Signed and Sealed this thirtieth Day of March 1976

[SEAL]

Attest:

RUTH C. MASON
Attesting Officer

C. MARSHALL DANN
Commissioner of Patents and Trademarks